United States Patent [19]
Caine

[11] Patent Number: 5,383,494
[45] Date of Patent: Jan. 24, 1995

[54] HOSE END CAP WITH PIVOTAL LOCK

[75] Inventor: Donald R. Caine, Greensboro, N.C.

[73] Assignee: Camco Manufacturing, Inc., Greensboro, N.C.

[21] Appl. No.: 81,118

[22] Filed: Jun. 25, 1993

[51] Int. Cl.⁶ ............................................. F16L 35/00
[52] U.S. Cl. .................................. 138/87; 138/96 R; 285/903
[58] Field of Search ............. 138/89, 96 R, 89.1–89.4, 138/96 T; 285/901, 903

[56] References Cited

U.S. PATENT DOCUMENTS

| | | | |
|---|---|---|---|
| 440,168 | 11/1890 | Kurtz | 138/96 R |
| 767,893 | 8/1904 | Jewell | 285/248 |
| 1,113,080 | 10/1914 | Wilson | |
| 1,934,681 | 11/1933 | Damsel | 138/96 R |
| 2,061,366 | 11/1936 | Mazurie | 138/96 R |
| 2,433,930 | 1/1948 | Speer | 285/71 |
| 3,075,358 | 1/1963 | Becker et al. | 138/96 R |
| 3,484,121 | 12/1969 | Quinton | 285/242 |
| 4,112,979 | 9/1978 | Widdicombe | 285/901 |
| 4,483,371 | 11/1984 | Susin | 138/89.2 |
| 4,660,860 | 4/1987 | Todd | 285/12 |
| 4,678,097 | 7/1987 | Crute | 138/89 |
| 4,688,833 | 8/1987 | Todd | 285/175 |
| 4,708,370 | 11/1987 | Todd | 285/12 |
| 4,777,985 | 10/1988 | Arduini et al. | 138/96 R |
| 4,799,716 | 1/1989 | Kujawa et al. | 138/89 |
| 5,048,571 | 9/1991 | Ellis | 138/89 |
| 5,180,196 | 1/1993 | Skinner | 285/903 |

FOREIGN PATENT DOCUMENTS

| | | | |
|---|---|---|---|
| 784239 | 7/1935 | France | |
| 2644223 | 9/1990 | France | |
| 130894 | 12/1932 | Germany | |
| 865885 | 7/1949 | Germany | |
| 168493 | 9/1959 | Germany | |
| 3619299 | 12/1987 | Germany | 138/96 R |
| 2048414 | 12/1980 | United Kingdom | |

Primary Examiner—David A. Scherbel
Assistant Examiner—Patrick F. Brinson

[57] ABSTRACT

An end cap for a flexible hose is provided which includes a depending pivotable member attached to an outer wall. The pivotable member can be swung upwardly between the inner and outer walls of the end cap to secure the end of a flexible hose therein. The end cap is integrally formed such as by molding from a medium density polymeric material such as polyethylene.

19 Claims, 1 Drawing Sheet

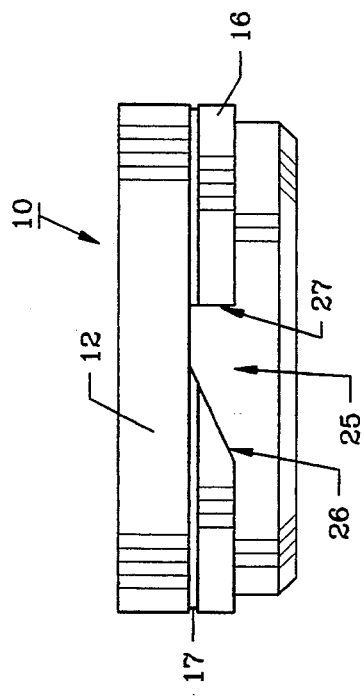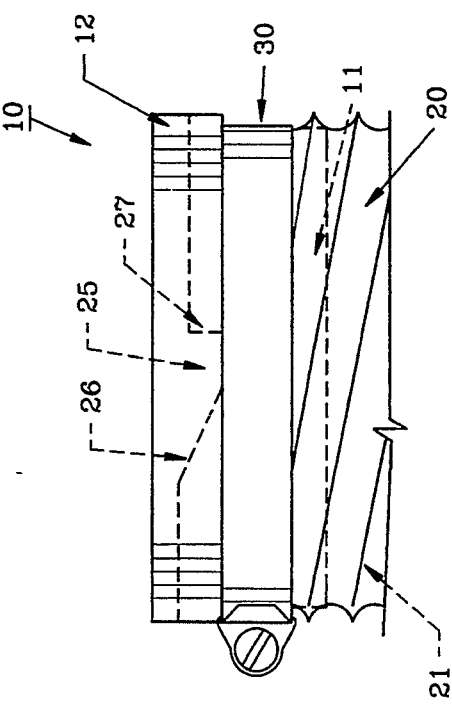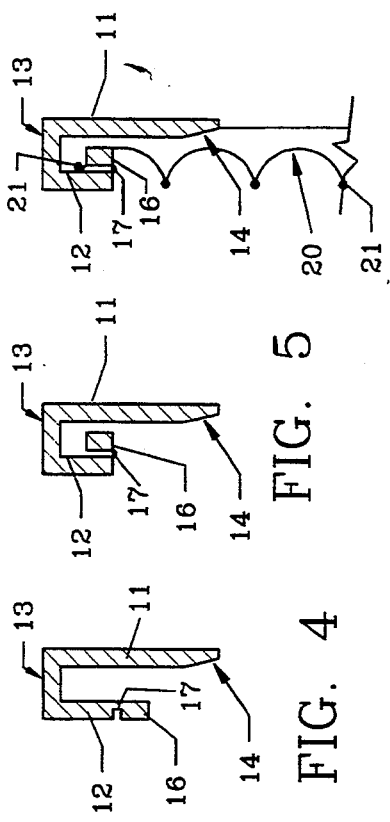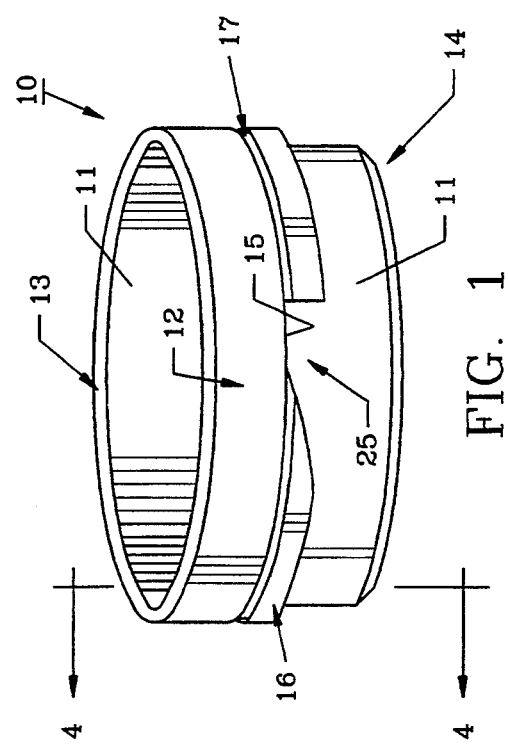

HOSE END CAP WITH PIVOTAL LOCK

BACKGROUND OF THE INVENTION

1. Field Of The Invention

The invention herein pertains to flexible sewage hose fittings as are connected to recreational vehicles (RV's) and pertains particularly to a convenient end cap which can be placed on the end of the hose and secured with an attached pivotable lock.

2. Description Of The Prior Art And Objectives Of The Invention

Sewage hoses are connected to RV's during overnight stops in parks and campgrounds in increasing numbers as more and more people prefer this type of vacation. Flexible sewage hoses generally used are formed of a vinyl outer tube and include an embedded spiral steel wire support. One end of the flexible sewage hose is joined to the discharge end of the RV sewage system which may consist of a pipe or fitting extending therebeneath. The other end of the sewage hose is then connected to a septic tank or sewage treatment facility provided. The ends of the flexible sewage hose are often cut with a knife or other instrument and may be uneven. Thus, when the uneven ends are attempted to be connected to the RV or other fittings, it is difficult to make the connection. An improper connection will allow raw sewage to escape therefrom. Personal injury may result due to the loose or protruding wire at the end of the hose.

While flexible sewage end caps have been previously used, such previous caps may become dislodged under sudden stress to the hose. Such ends caps are generally formed of flexible plastic materials which may expand or distort in hot weather or when the temperature of the plastic material reaches a certain point.

With the known problems associated with conventional flexible sewage hose connections, the present invention was conceived and one of its objectives is to provide a flexible sewage hose end cap which can be quickly, easily affixed to the end of a hose without special tools and to attach the hose to the RV discharge and the septic tank connections.

It is another objective of the present invention to provide a cylindrically shaped flexible sewage hose end cap which includes a pivotable lock for a secure connection.

It is yet another objective of the present invention to provide a flexible sewage hose end cap which can be rapidly attached to the RV discharge and septic connection by an inexperienced user.

It is yet another objective of the present invention to provide a flexible sewage hose end cap which is relatively inexpensive to manufacture and can be provided at a reasonable cost to the purchaser.

Various other objectives and advantages of the present invention become apparent to those skilled in the art as a more detailed description is set forth below.

SUMMARY OF THE INVENTION

The objectives set out above can be realized by providing a flexible hose end cap which is integrally molded from a flexible polymeric material such as a medium density polyethylene. The end cap contains concentric inner and outer walls which are joined at the top and which are spaced to allow a conventional flexible sewage hose end to rest therebetween. Depending from the outer wall in substantially continuous encircling fashion is a pivotable member which is hingedly attached at the bottom of the outer wall. Thus, by folding the pivotable member upwardly, between the inner and outer walls a lock is provided on the hose end which will prevent the end of the hose previously positioned therein from escaping. The pivotable lock defines a notch which will assist while attaching the hose end cap to the hose. If desired the pivotable lock member can be returned to its original extended position, from between the inner and outer walls and the sewage hose can then be removed from the end cap.

BRIEF DESCRIPTION OF THE DRAWINGS

FIG. 1 demonstrates in perspective fashion a hose end cap of the invention;

FIG. 2 shows a side elevational view of the hose end cap as shown in FIG. 1;

FIG. 3 pictures the hose end cap seen in FIG. 2 with a conventional flexible sewage hose positioned thereon and with an adjustable clamp;

FIG. 4 depicts a cross-sectional view along lines 4—4 as seen in FIG. 1;

FIG. 5 illustrates the cross-sectional view of FIG. 4 but with the pivotable member in an upward or "locked" position; and FIG. 6 demonstrates the cross section of end cap 10 as seen in FIG. 5 with the sewage hose end locked therein.

DESCRIPTION OF THE PREFERRED EMBODIMENT

The preferred form of the hose end cap of the invention is shown in FIGS. 1-6 and includes a cylindrically shaped hose end cap formed from a polymeric material such as by integrally molding conventional medium density polyethylene. End cap 10 includes an outer wall and an inner wall which are joined along the top and provide a space therebetween for reception of a flexible sewage hose end. A pivotable lock member is provided which is hingedly joined to the lower end of the outer wall and which can be moved or swung inwardly to lock the end of the sewage hose in place. The hinge comprises a thin, flexible wall segment as shown in FIG. 4. A notch or space is provided in the otherwise continuous pivotable member which includes a vertical and biased side as seen in FIG. 1. The biased side, when folded inwardly between the inner and outer walls provides an inclined plane for sliding the end of the embedded wire of the hose thereon as the end cap is turned onto the hose during attachment.

DETAILED DESCRIPTION OF THE DRAWINGS AND OPERATION OF THE INVENTION

For a more complete understanding of the invention and its operation, turning now to the drawings, FIG. 1 shows a perspective view of open end cap 10 which may be formed of conventional polymeric materials such as a medium density polyethylene and includes inner wall 11 and outer wall 12 which are joined together along top 13. As shown in FIG. 1, inner wall 11 is at least two times or longer than wall 12 and is tapered at its terminal end 14 as shown in FIGS. 4-6. Along the bottom end 15 (FIG. 1) of outer wall 12, pivotable member 16 is attached by hinge 17 which consists of a thin, flexible segment as shown more clearly in FIGS. 4 and 5. Although not usually needed, clamp 30 is shown in FIG. 3 which may be used when hose 20 is subjected to very high stresses such as sudden jerks or impact thereto to help maintain end cap 10 on an RV discharge or on a septic tank fitting.

In FIG. 4 pivotable member 16 is shown in an extended position whereas in FIG. 5 pivotable member is shown in a folded or locked position for securing flexible hose 20 also as seen in FIGS. 3 and 6. In FIG. 6 hose 20 is shown in cross-sectional view with wire spiral 21 exposed for clarity. As would be understood, hose 20 comprises a flexible polyvinyl chloride covering with an embedded continuous spiral or coil wire 21 therein. Pivotable member 16 as shown in FIG. 6 locks hose 20 between inner wall 11 and outer wall 12 as member 16 is folded inwardly and engages hose 20 which has been positioned between inner wall 11 and outer wall 12. As shown in FIGS. 4-6, hinge 17 allows pivotal member 16 to rotate in a substantially 180° path.

Pivotable member 16 as shown in FIGS. 1-6 comprises a substantially continuous ring which encircles inner wall 11. However, a discontinuous ring or tab-like projections could be used on outer wall 12 if desired.

Various flexible hose manufacturers produce hoses having either a left to right or a right to left spiral and in FIG. 3 hose 20 is shown with a right to left spiral. Pivotable member 16 defines notch 25 therein with one side 26 having a bias and with the other side 27 being substantially vertical. As shown, with pivotable member 16 placed in the locked position as seen in FIG. 5, biased side 26 of notch 25 somewhat parallels spiral 21 whereby, hose 20 can be easily turned and secured onto end cap 10 by placing the end of spiral 21 into notch 25 and rotating end cap 10 thereon. As would be understood, for a fitting on a flexible hose having a left to right spiral wire embedded therein, side 26 would be vertical and side 27 would be biased to accommodate attachment thereto.

It has been found that end cap 10 can be integrally molded of a medium to low density polyethylene which is relatively inexpensive and suitable for its intended purposes. However, various other types of suitable materials may also be used.

The illustrations and examples provided herein are for explanatory purposes and are not intended to limit the scope of the appended claims.

I claim:

1. An open hose end cap to allow fluid flow therethrough comprising:
   (a) an inner wall;
   (b) an outer wall, said inner wall joined to said outer wall, said inner wall concentric with said outer wall and forming a space to receive a hose end therebetween; and
   (c) a pivotal member attached to said outer wall by a hinge for movement between said inner wall and said outer wall to secure a hose end therebetween.

2. The hose end cap as claimed in claim 1 wherein said pivotal member is attached at the bottom of said outer wall.

3. The hose end cap as claimed in claim 1 wherein said pivotal member comprises a ring which is substantially continuous with said outer wall.

4. The hose end cap as claimed in claim 1 wherein said pivotal member defines a hose end receiving notch.

5. The hose end cap as claimed in claim 4 wherein said pivotal member defines a notch having a biased side.

6. The hose end cap as claimed in claim 1 wherein said hinge allows up to substantially 180° degree pivotal movement of said pivotal member.

7. The hose end cap as claimed in claim 1 wherein said hinge comprises a flexible segment.

8. The hose end cap as claimed in claim 1 wherein said outer wall, inner wall, pivotal member and hinge are integrally formed from a polymeric material.

9. The hose end cap as claimed in claim 1 wherein said inner wall has a tapered end.

10. A hose end cap comprising:
    (a) an inner wall;
    (b) an outer wall, said inner wall joined to said outer wall, said inner and said outer walls forming a space therebetween for receiving the end of a flexible hose; and
    (c) a pivotal member substantially surrounding said inner wall and attached to said outer wall by a hinge for pivotal movement between said inner and said outer walls to secure a flexible hose therebetween.

11. The hose end cap as claimed in claim 10 wherein said inner wall has a length greater than said outer wall.

12. The hose end cap as claimed in claim 10 wherein said hinge allows up to substantially 180 degree pivotal movement of said pivotal member.

13. The hose end cap as claimed in claim 10 wherein said outer wall, inner wall, hinge and pivotal member are integrally formed from a polymeric material.

14. The hose end cap as claimed in claim 13 wherein said polymeric material comprises a medium density polyethylene.

15. The hose end cap as claimed in claim 10 wherein said inner wall has a tapered end.

16. The hose end cap as claimed in claim 11 wherein said pivotal member defines a notch.

17. The hose end cap as claimed in claim 16 wherein said notch has a biased side.

18. The hose end cap as claimed in claim 10, wherein:
    (a) said hinge comprises a flexible segment attached at an inside edge of the bottom of said outer wall;
    (b) said inner wall is concentric with said outer wall, said inner wall having a greater length than said outer wall;
    (c) said pivotal member comprises a ring that is substantially continuous with said outer wall;
    (d) said pivotal member defines a single hose end receiving notch having a single biased side;
    (e) said hinge allows substantially 180 degree movement of said pivotal member;
    (f) said outer wall, inner wall, pivotal member and hinge are integrally formed from a medium density polyethylene;
    (g) said inner wall has a tapered end; and
    (h) said pivotal member substantially circumferentially surrounds said inner wall.

19. A hose end cap, comprising:
    (a) an outer wall;
    (b) an inner wall having a greater length than said outer wall and joined to said outer wall to form a space therebetween for receiving a hose end; and
    (c) a pivotal member attached to said outer wall by a hinge for pivotal movement between said inner wall and said outer wall to secure a hose end therebetween.

* * * * *